United States Patent [19]

Ogino

[11] Patent Number: 4,752,279

[45] Date of Patent: Jun. 21, 1988

[54] SPROCKET DEVICE WITH OIL LUBRICATION

[75] Inventor: Teiji Ogino, Kaga, Japan

[73] Assignee: Enuma Chain Manufacturing Co., Ltd., Japan

[21] Appl. No.: 63,491

[22] Filed: Jun. 18, 1987

[30] Foreign Application Priority Data

Jun. 20, 1986 [JP] Japan .............................. 61-142708

[51] Int. Cl.$^4$ ............................................ F16H 57/04
[52] U.S. Cl. ......................................... 474/91; 74/467
[58] Field of Search ................. 474/91, 152; 184/15.1; 74/467, 468; 198/500, 501

[56] References Cited

U.S. PATENT DOCUMENTS

| 807,731 | 12/1905 | Dodge | 474/91 |
|---|---|---|---|
| 2,134,490 | 10/1938 | Shartle, Jr. | 474/91 |
| 3,574,423 | 4/1971 | Thomson | 474/91 X |
| 4,346,801 | 8/1982 | Redder et al. | 198/500 |
| 4,696,201 | 9/1987 | Hattori et al. | 74/467 |
| 4,703,724 | 11/1987 | Candea et al. | 74/467 |

Primary Examiner—Stephen J. Novosad
Assistant Examiner—Thuy M. Bui

[57] ABSTRACT

A sprocket device with an oil lubrication comprises: a stationary drum provided with a flange portion and a bearing portion at its side surface; a sprocket provided with tooth portions and thin holes which is provided at opposite sides of the tooth portions and spaced apart from each other and reaching an inner peripheral surface of the sprocket, which sprocket being closely and rotatably mounted on the stationary drum; a gear pump having a pair of gears which are meshed with each other and mounted in the one side surface of said stationary drum, the gear pump being provided with an oil-discharge hole which is formed in the one side surface of the stationary drum and communicated with an oil channel which opens to an outer peripheral surface of the stationary drum, the oil channel being connected with an oil groove axially extending from an opening portion of the oil channel; and a rotary shaft rotatably inserted into the sprocket and stationary drum, and integrally connected with said one of said gears of said gear pump so as to enable said one of said gears to rotate together with said sprocket at the same speed as that of said sprocket.

5 Claims, 3 Drawing Sheets

SPROCKET DEVICE WITH OIL LUBRICATION

BACKGROUND OF THE INVENTION

1. Field of the Invention

The present invention relates to a sprocket device with an oil lubrication, serving as a power transmitting means in cooperation with a steel chain which is adapted for power transmission use or serves as a conveyer chain.

2. Description of the Prior Art

In the steel chain, regardless of its use such as the power transmission use or article-conveyance use, it is always necessary to lubricate the chain at its flexible node points in order to prevent the chain from being worn.

Accordingly, hitherto employed are various lubricating methods such as an oil-bath lubrication method in which the chain dips below the oil surface, an oil-spray lubrication method by the use of an oil-injection system, a flood-lubrication method, a manual-lubrication method such as a manual-feed and a drop-feed methods.

However, the methods such as the oil-bath and the oil-spray lubrication suffer from expensive installation cost, and, therefore, these methods are economically disadvantageous. On the other hand, the manual-lubrication method suffers from its cumbersome lubrication work, and, in some location it is impossible to do such lubrication work.

In addition, there is another lubrication method in which is employed a simple lever-type plunger pump for feeding a lubricant to a necessary point. However, such method can not perform a sufficient lubrication when the chain is driven at a high speed, and, therefore is not adequate for such high speed chain while disadvantageous in its loose oil delivery. As a result, maintenance personnel for the lubrication of the chain are forced to a very hard work at the present time.

SUMMARY OF THE INVENTION

The present invention is made in consideration of the above disadvantages inherent in the prior art. Accordingly, it is an object of the present invention to provide a novel sprocket device with an oil lubrication, which can find a lubricant or oil automatically, efficiently and surely to a chain according to a driving speed of the chain and can also stop oil feed surely upon stoppage of the chain drive to prevent over-delivery of the oil leading to contamination of the device and wastage of the oil. The sprocket device of the present invention can perform an automatic lubrication of the chain without employing any expensive related system and without being involved in a cumbersome manual work.

According to the present invention, there is provided: A sprocket device with an oil lubrication comprising: a stationary drum provided with a flange portion at a peripheral edge portion of its one side surface and a bearing portion at an extending portion of its the other side surface; a ring-like sprocket having a substantially convex shape in its section, provided with a large-diameter portion and a small-diameter portion, said large-diameter portion being provided with tooth portions in its outer peripheral portion and a plurality of thin holes at opposite sides of said outer peripheral portion thereof, said thin holes being spaced apart from each other and reaching an inner peripheral surface of said sprocket; said sprocket being closely and rotatably mounted on said stationary drum; a gear pump having a pair of gears which are meshed with each other and mounted in said one side surface of said stationary drum so that one of said gears is positioned at a center of said one side surface of said stationary drum, said gear pump being provided with an oil-discharge hole which is formed in said one side surface of said stationary drum and communicated with an oil channel which opens to an outer peripheral surface of said stationary drum, said oil channel being connected with an oil groove axially extending from an opening portion of said oil channel; and a rotary shaft rotatably inserted into both said sprocket and said stationary drum, and integrally connected with said one of said gears of said gear pump so as to enable said one of said gears to rotate together with said sprocket at the same speed as that of said sprocket.

DESCRIPTION OF THE PREFERRED EMBODIMENT

Hereinbelow will be described a preferred embodiment of the present invention with reference to the drawings. It is clearly understood that the present invention is not limited only to this embodiment.

Figure 1:
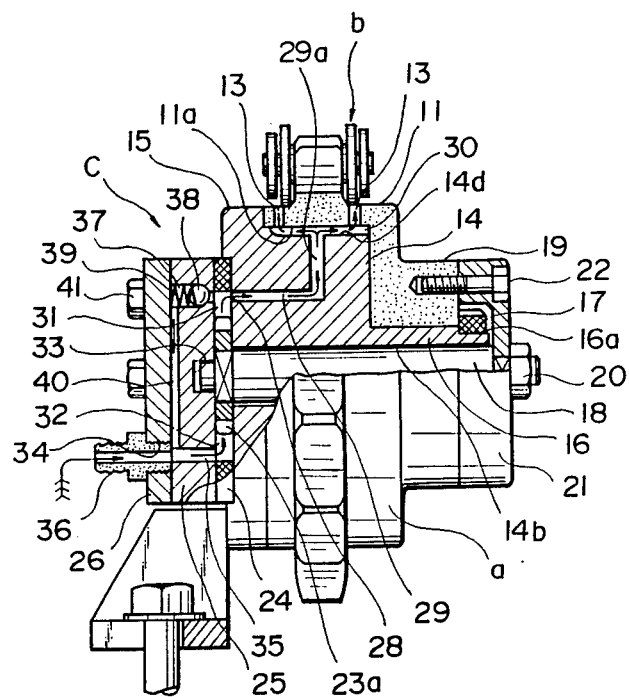
FIG. 1 is a partially broken front view of a sprocket device provided with a gear pump according to the present invention, illustrating a lubrication condition thereof.

As shown in FIG. 1, the reference character "a" denotes a ring-like sprocket serving as a power transmitting means meshed with a steel chain "b" which is adapted for a power transmission use or serves as a conveyer chain. The sprocket "a" has a substantially convex shape in its section and a large-diameter portion 11 in all outer peripheral surface of which are formed a plurality of tooth portions 12. A plurality of thin holes 13 are provided in the all outer peripheral surface of the large-diameter portion 11 of the sprocket "a" at opposite sides of the tooth portions 12, more particularly of tooth root portions 12a thereof so as to be circumferentially spaced apart from each other. Incidentally, although the thin holes 13 are shown in the embodiment in FIG. 1 so as to be constantly distributed over the entire outer peripheral surface of the large-diameter portion 11 of the sprocket "a", it is also possible to distribute the thin holes 13 intermittently.

The reference numeral 14 denotes a stationary drum for rotatably supporting the sprocket "a" in an insertion manner. The drum 14 is provided with a flange portion 15 at a peripheral edge portion of its one side surface 14a, while provided with a bearing portion 16 at a center of the other side surface thereof. The bearing portion 16 of the stationary drum 14 extends in a direction perpendicular to a rotational direction of the sprocket "a" so as to be positioned at a rotation center of the sprocket "a". An outer peripheral surface of a front end of the bearing portion 16 of the stationary drum 14 is threaded to form a male screw 16a with which is threadably engaged an engaging ring 17 for preventing the sprocket "a" from dropping out of the stationary drum 14. In the stationary drum 14 is coaxially form an axial bore 14b passing coaxially through the bearing portion 16 of the drum 14 so that the axial bore 14b extends in the direction perpendicular to the rotational direction of the sprocket "a" and is positioned at the center of the rotation of the sprocket "a". Into the axial bore 14b of the stationary drum 14 is rotatably inserted a rotary shaft 18 a length of which is so determined that opposite ends of the rotary shaft 18 extend outward from both of the one side surface 14a and the bearing portion 16 of the stationary drum 14.

The stationary drum 14 is closely inserted at its bearing portion 16 into the sprocket "a" so as to rotatably support the same "a", and then the engaging ring 17 is threadably engaged with the male screw 16a of the bearing portion 16 so as to prevent the sprocket "a" from dropping out of the stationary drum 14. The one end portion of the rotary shaft 18 extends outward from the bearing portion 16 of the stationary drum 14 and threadably engaged with a nut 20 through a connecting plate 21 which is also fixed to an end surface of a small-diameter portion 19 of the sprocket "a" by means of bolts 22.

In the one side surface 14a of the flange portion 15 of the stationary drum 14 is provided a gear pump "c" employing the stationary drum 14 as its base plate. The gear pump "c" is constructed of: the stationary drum 14 serving as the base plate of the gear pump "c"; a pair of gears 23a and 23b rotatably mounted in the one side surface 14a of the stationary drum 14; a casing plate 24 blanked to provide a casing portion 24a for receiving the pair of the gears 23a and 23b; an intermediate plate for covering the casing portion 24a of the casing plate 24; and an outer plate 26 mounted on the intermediate plate 25 for covering the same 25.

A pair of shoulder portions 14c are formed in the one side surface 14a of the stationary drum 14 for receiving and positioning the casing plate 24. From a central portion of the one side surface 14a of the stationary drum 14 is extended outward the other end of the rotary shaft 18 and rotatably supports the gear 23a thereon to make it possible that the gear 23a is rotatably driven when the rotary shaft 18 is rotatably driven in accordance with the rotation of the sprocket "a". The other gear 23b is rotatably supported a supporting shaft 27 fixedly mounted in the one side surface 14a of the stationary drum 14, and is meshed with the gear 23a.

Incidentally, the shoulder portions 14c are employed to facilitate the positioning of the casing plate 24, and, therefore, not necessarily required. Further, in the embodiment of the present invention shown in the drawings, in order to fix both of the gear 23a and the connecting plate 21 to the rotary shaft 18 so as to transmit driving torque thereto, the rotary shaft 18 is squared off at its opposite ends. However, it is also possible to employ a key and the like to accomplish the same object.

An oil-discharge port 28 is formed in an oildischarge side of the gears 23a, 23b in the one side surface 14a of the stationary drum 14. The oil-discharge port 28 leads to an oil channel 29 opening to an outer peripheral surface 14d of the stationary drum 14, which outer peripheral surface 14d is brought into a slidable contact with an inner peripheral surface 11a of the sprocket "a". Also formed in the outer peripheral surface 14d of the stationary drum 14 is an oil groove 30 extending from an opening portion 29a of the oil channel 29.

The casing plate 24 is blanked to form a gogglelike casing portion 24a which closely encircles peripheries of the gears 23a and 23b between which is formed an oil-discharge channel 31 in the oil-discharge side of the gear pump "c", which channel 31 communicates with the oil-discharge port 28. An oil-suction channel 32 is formed in an oil-suction side of the gear pump "c" in which side the tooth portions separate.

Figure 3:
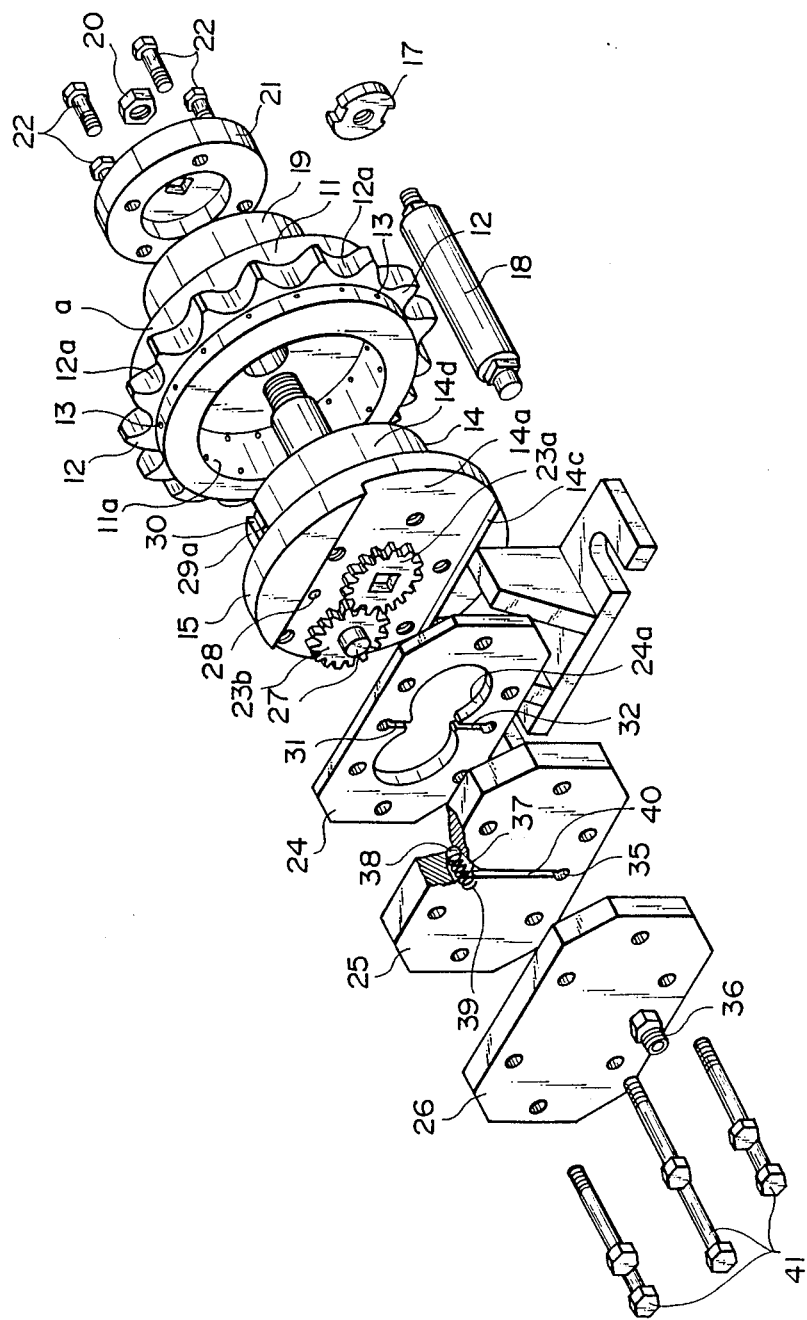
FIG. 3 is an exploded perspective view of the sprocket device of the present invention shown in FIG. 1.

In an inner surface of the intermediate cover plate 25 are formed a pair of bearing bores 33 for supporting the other end of the rotary shaft 18 and the front end portion of the supporting shaft 27. In a position of the intermediate cover plate 25 corresponding to the position of the suction-side oil channel 32 is provided an oil-suction port 35 communicating with the oil channel 32. In FIG. 3, the reference numeral 36 denotes a connecting pipe threadably connected to an opening portion 34 of the oil-suction port 35. The connecting pipe 36 is connected to a front end portion of pipe line such as a hose (not shown) connected to a lubricant reservoir.

In a position of the intermediate cover plate 25 corresponding to the position of the oil-discharge port 31, there is formed an oil-return channel 37 having a restricted opening. In such return channel 37 is incorporated a pressure regulating valve constructed a ball check valve 38 and a compression spring 39 seated on the outer cover plate 26 so as to urge the ball check valve 38 toward the restricted opening of the oil-return channel 37. Another oil-return channel 40 is formed in an outer-side surface of the intermediate cover plate 25 so as to extend from an outer opening portion of the channel 37 to the outer opening 34 of the oil-suction port 35. The another oil-return channel 40 is sealed with the outer cover plate 26. Consequently, an excess amount of oil having been discharged to the discharge-side channel 31 is recirculated to the suction-side channel 32 through the above pressure regulating valve.

In assembling, the casing plate 24, the intermediate cover plate 25 and the outer cover plate 26 are stacked and integrally secured to the one side surface 14a of the stationary drum 14 by means of bolts 41.

Figure 2:
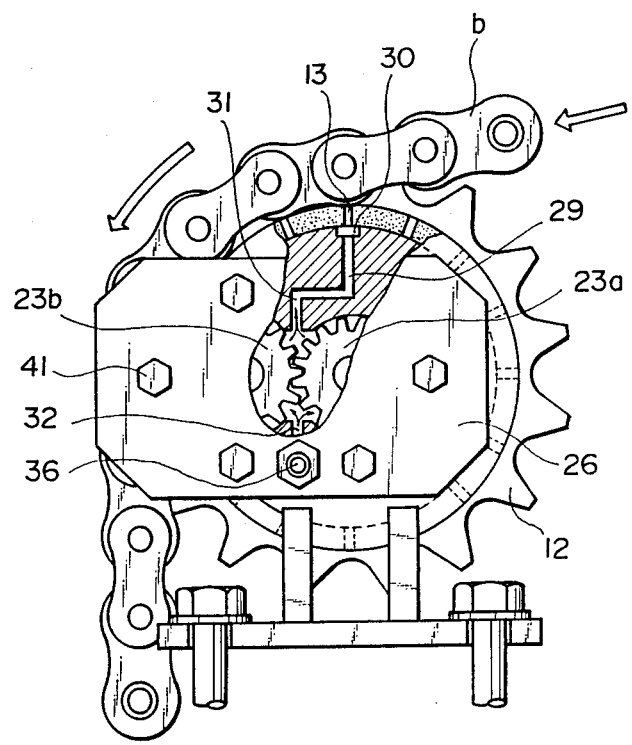
FIG. 2 is a partially broken side view of the sprocket device of the present invention shown in FIG. 1.

When the chain "b" is driven counterclockwise in FIG. 2, the sprocket "a" is also driven counterclockwise. As a result, the gear 23a of the pair of the gears of the gear pump "c" is also driven counterclockwise so that the other gear 23b is driven clockwise. Incidentally, in case that the sprocket "a" is driven first, the chain and the gear pump are operated in the same manner as the above. Rotation of the gears 23a and 23b causes the oil filled in the gear pump "c" to flow, so that the oil is discharged to the oil-discharge port 28 while sucked from the oil-suction port 34 into the gear pump "c". The oil having discharged from the oil-discharge port 28 passes through the channel 29 formed in the stationary drum 14 and fed to the oil groove 30 under pressure. Since the oil groove 30 is sealed with the inner surface of the sprocket "a", the oil is intermittently discharged through the thin holes 13 only when such thin holes 13 reach the oil groove 30 without causing any leakage of the oil, to make it possible to feed the oil to the chain. When the chain operation is stopped, the gear pump also stops its operation so that the oil flow stops to lead to stoppage of oil feed.

Incidentally, in case that tooth portions 12 of the sprocket "a" is coincident in number with tooth portions of the gear 23a or 23b of the gear pump "c", it is possible to keep the peak of pulsating discharge of the gear pump "c" synchronized with lubricating timing of the sprocket "a".

As described in the above, according to the present invention, the sprocket "a", which is meshed with the steel chain adapted for power transmission use or article-conveyance use, is provided with the gear pump "c" synchronized with the sprocket "a" in rotation so as to feed the lubricant to the chain only when the chain is under operation, it is possible to feed the lubricant to the chain over the wide range of operation speed of the chain, or regardless of the chain speed. Further, when the chain stops its operation, the gear pump also stops its operation to stop oil feed, so that it is possible to prevent a loose lubrication, which leads to elimination of wastage of oil and contamination of the system.

In addition, according to the present invention, since the thin holes are provided at the opposite sides of the tooth portions of the sprocket so as to feed the oil to the flexible node points of the chain during its operation, it is possible to surely feed the oil to such flexible node points of the chain in its operation in an efficient manner.

Further, according to the present invention, since the conventional expensive related system of lubrication is replaced with the gear pump having a simple construction, it is possible to provide a useful chain at a low cost, while the cumbersome manual feed of the oil is eliminated. Consequently, a remarkable improvement is achieved in lubrication maintenance. In addition, since the gear pump is compact and hermetic in construction, it is excellent in degree of freedom in installation so as to be installed any location required. Consequently, it is possible to employ the sprocket device of the present invention in any of the industrial fields including the power transmission and the article-conveyance fields.

What is claimed is:

1. A sprocket device with an oil lubrication comprising: a stationary drum provided with a flange portion at a peripheral edge portion of its one side surface and a bearing portion at an extending portion of its the other side surface; a ring-like sprocket having a substantially convex shape in its section, provided with a large-diameter portion and a small-diameter portion, said large-diameter portion being provided with tooth portions in its outer peripheral portion and a plurality of thin holes at oppposite sides of said outer peripheral portion thereof, said thin holes being spaced apart from each other and reaching an inner peripheral surface of said sprocket; said sprocket being closely and rotatably mounted on said stationary drum; a gear pump having a pair of gears which are meshed with each other and mounted in said one side surface of said stationary drum so that one of said gears is positioned at a center of said one side surface of said stationary drum, said gear pump being provided with an oil-discharge hole which is formed in said one side surface of said stationary drum and communicated with an oil channel which opens to an outer peripheral surface of said stationary drum, said oil channel being connected with an oil groove axially extending from an opening portion of said oil channel; and a rotary shaft rotatably inserted into both said sprocket and said stationary drum, and integrally connected with said one of said gears of said gear pump so as to enable said one of said gears to rotate together with said sprocket at the same speed as that of said sprocket.

2. The sprocket device as set forth in claim 1, wherein: said thin holes are provided in opposite positions between which is interposed each of tooth root portions of said tooth portions of said sprocket.

3. The sprocket device as set forth in claim 1, wherein: said thin holes are provided intermittently along tooth root portions of said tooth portions of said sprocket.

4. The sprocket device as set forth in claim 1, wherein: said thin holes are provided in opposite positions between which is interposed each of tooth root portions of said tooth portions of said sprocket, each of said thin holes being alternately provided in said opposite portions.

5. The sprocket device as set forth in claim 1, wherein: said tooth portions of said sprocket is coincident in number with tooth portions of said gear of said gear pump to keep the peak of the pulsating discharge of said gear pump synchronized with the lubrication timing of said sprocket.

* * * * *